May 5, 1936. N. O. FOGELSTRÖM 2,039,787
COUPLING FOR HOSES, PIPES AND THE LIKE
Filed Aug. 20, 1935
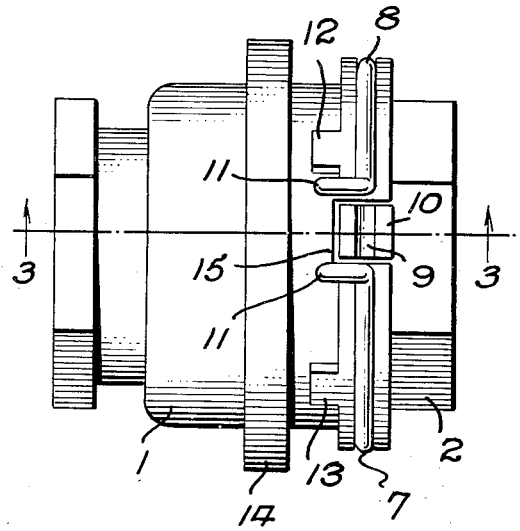
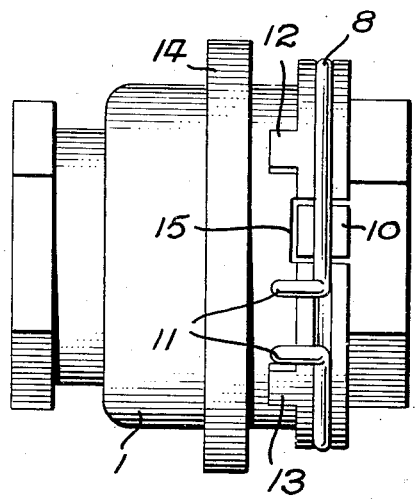
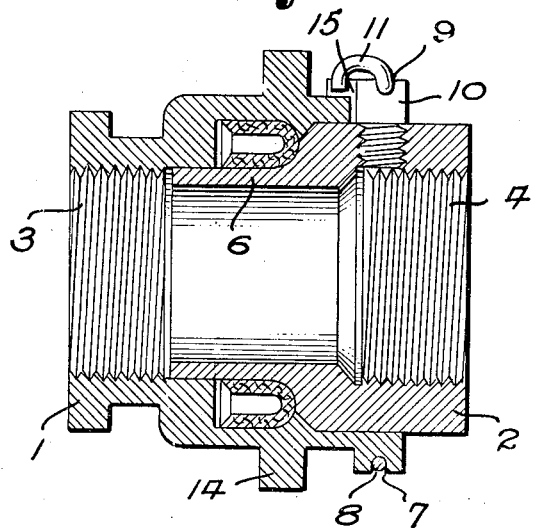
INVENTOR.
NIELS OTTO FOGELSTRÖM
BY Haseltine Lake & Co.
ATTORNEYS Patented May 5, 1936

2,039,787

UNITED STATES PATENT OFFICE 2,039,787

COUPLING FOR HOSES, PIPES, AND THE LIKE

Niels Otto Fogelström, Kastrup, Denmark

Application August 20, 1935, Serial No. 36,949
In Denmark May 17, 1934

1 Claim. (Cl. 285—177)

This invention relates to separable couplings for hose, piping and the like, and particularly to the type in which one coupling member is directly inserted a limited distance into the other and capable of being locked in assembled position by a partly rotatable exterior locking member disposed on the first member, while an efficient form of packing is provided interiorly to ensure tightness of the juncture of the coupling members.

The main object of my invention is to provide a practical coupling of the character indicated which is very substantial, simple and both quickly and securely assembled at will.

Another object is to provide such a coupling which is simple and economical to manufacture and therefore saleable at a reasonably low price.

Other objects and advantages inherent in the construction and actual use of the invention, will appear more fully in detail as the specification proceeds.

In the accompanying drawing forming part hereof,

Fig. 1 is a side elevation of a coupling made according to the present invention and embodying its salient features in practical form, the coupling member being shown in initially assembled relation.

Fig. 2 is a similar view showing an exterior locking member in locking position so as to effectively lock the coupling members together.

Fig. 3 is a longitudinal section of the coupling on line III—III.

Throughout the views, the same reference numerals indicate the same or corresponding parts.

For joining of hoses and pipes it is common practice to use assembling nipples with helical threads, but such type of assembling is complicated, because the two threaded ends have to be in axial alinement in order to be able to be brought together, and further the assembling itself requires some time, and the efficiency of the tightness depends on the accuracy with which the threads have been cut.

Especially for fire hoses, it is very desirable to have a coupling that can be assembled quickly and efficiently, and the present invention relates therefore to such a coupling which is in great part characterized by the provision between the two coupling parts, of a leather packing with U-shaped cross-section known per se, for the purpose of ensuring the tightness between the said two parts, in such a manner that one coupling part can be introduced directly into the other one, without any rotation or the like, the said coupling part in contact with the leather packing forming thereby a perfectly liquid-tight joint.

The invention relates further to various details of the coupling part, such as the arrangement serving to lock the parts together. This as well as the other details of the coupling are further described in the following, in connection with the practical form of the invention shown on the drawing.

The two coupling parts 1 and 2 are shown in side elevation, partly in section, and they are each connected in known manner to hoses or pipes not shown, for instance by the latter being screwed into the internal threads 3 and 4 of the coupling parts. Within the coupling part 1, a leather packing 5 of U-shaped cross-section is attached, and when the coupling part 2 is inserted into the part or projecting sleeve portion 1, the front part 6 of the former will rest tightly against the leather packing, in such a manner that a perfectly liquid-tight joint will be formed. The mutual attachment of the two coupling parts 1 and 2 is effected by a special arrangement, the main part of which is a resilient annular member 8 disposed in a groove 7 in the coupling part 1, which member by a rotation in its groove can be caused to engage a groove 9 in a lug 10 on the coupling part 2, which lug, when the coupling parts 1 and 2 are pushed entirely into one another, is inserted into a recess 15 in the coupling part 1, whereby the groove 9 comes into line with the groove 7. The ends 11 of the annular member 8 are bent over the edge of the grove 7, in such a manner that the ends 11 can co-operate with a pair of spaced stopping lugs 12 and 13 on the coupling part 1. The rotary motion of the annular member 8 will thereby be limited, in such a manner that when one end 11 strikes the lug 13, the said member 8 will be in secure engagement with the groove 9 in the lug 10, but gagement with the groove 9 in the lug 10, but when the other end 11 strikes the other lug 12, the member 8 will be out of engagement with the groove 9 in the lug 10, in such a manner that the coupling parts 1 and 2 can freely be withdrawn from one another.

In order to protect the annular member 8 and the ends 11 of the same against blows, percussions and the like, the coupling part 1 is fitted with a heavy external collar 14 adapted to catch the major part of the blows directed towards the coupling.

Having now described my invention what I claim as new and desire to secure by Letters Patent is:

A coupling comprising male and female members, means for locking said members together, comprising a pair of parallel spaced flanges on said female member near one end thereof, said female member having a cut-out portion at said end extending through said flanges, a resilient split ring rotatably disposed between said flanges, said ring having end portions bent upwardly and around one of said flanges, means for limiting the movement of said ring, comprising stops, the end portions of said ring selectively engaging with one or the other of said stops, a locking block removably secured to said male member at the periphery thereof and having a peripheral groove, said block slidably fitting into said cut-out portion, said groove registering with said ring so that upon rotary movement of said ring said male and female members are locked together, said female member having an annular recess therein, a pressure responsive gasket disposed in said recess, said male member having an end portion engaging with said gasket and a tubular extension of reduced cross section projecting into said female member beyond said gasket.

NIELS OTTO FOGELSTRÖM.